May 26, 1925.
C. G. HAWLEY
CENTRIFUGAL FIXTURE
Filed Nov. 28, 1924
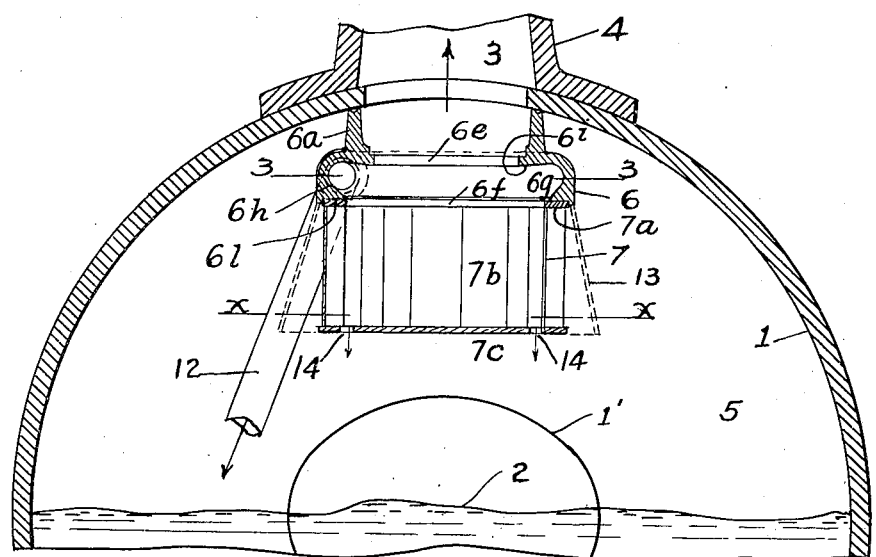
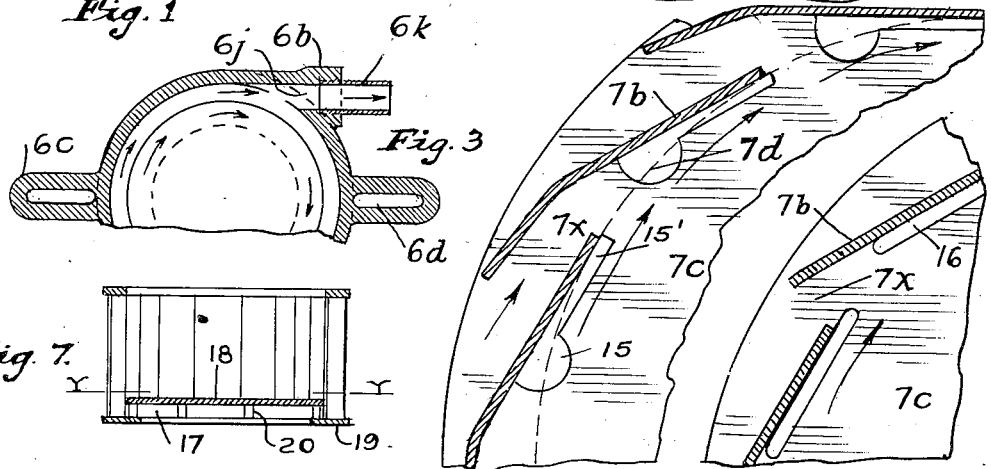
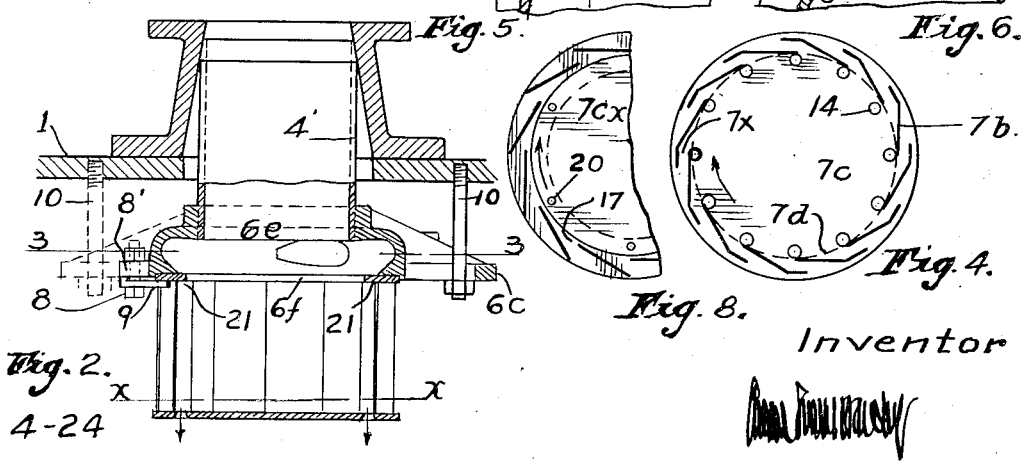
Inventor Patented May 26, 1925.

1,539,480

UNITED STATES PATENT OFFICE.

CHARLES GILBERT HAWLEY, OF CHICAGO, ILLINOIS, ASSIGNOR, BY MESNE ASSIGNMENTS, TO CENTRIFIX CORPORATION, OF CLEVELAND, OHIO, A CORPORATION OF DELAWARE.

CENTRIFUGAL FIXTURE.

Application filed November 28, 1924. Serial No. 752,719.

*To all whom it may concern:*

Be it known that I, CHARLES GILBERT HAWLEY, a citizen of the United States, residing at Chicago, Cook County, Illinois, have invented certain new and useful Improvements Entitled Centrifugal Fixtures, of which the following is a specification.

In all processes of distillation and evaporation, and throughout the arts of fluid purification and rectification, as by separators, it is both assumed and desired that the fluid evolved or treated shall leave the drum or container in a pure state, free from foreign substances, such as heavier liquids and solids. But as a rule the conditions controlling and modifying the operation in some measure defeat this primary expectation and purpose, and, eventuate in producing or permitting the escape of impure fluids.

The present invention comprises a centrifugal fixture; that is, a device which does not itself move or rotate, but nevertheless reliably induces a strong centrifugal action within the escaping or discharged fluid, whereby the foreign substances are certainly and definitely removed from the flowing or escaping fluid and either returned to the container or discharged externally if it be desired to rid the container thereof.

The objects of the invention are to perfect such processes of purification and to provide a simple and reliable device or apparatus for the performance of the perfected process. These objects and the specific character of the invention will presently appear in further detail.

The invention will be readily understood on reference to the drawings that form part of this specification, in which:

Fig. 1 is a vertical cross-section of a steam boiler drum, or the like, equipped with a centrifugal fixture embodying this invention. Fig. 2 is a longitudinal vertical section of the fixture, and also discloses a minor modification in the shape of the top of the fixture. Fig. 3 is a horizontal section on the lines 3—3 of Figs. 1 and 2. Fig. 4 is a cross-section on the line *x—x* of Figs. 1 and 2. Fig. 5 is an enlarged detail of the tuyère blades and tuyère bottom, with openings of modified form in the latter. Fig. 6 illustrates a further modification in the shape of the openings in the tuyère bottom; Fig. 7 discloses still another method of providing openings in the bottom of the tuyère member, and Fig. 8 is a partial horizontal section taken on a line *y—y* of Fig. 7.

Referring to Fig. 1, 1 represents the pressure drum, 2 the liquid level therein, 3 the outlet opening and 4 the nozzle proper. It will be understood that the offtake pipe joins the nozzle. The end of the drum contains the usual manhole 1' with its cover plate. But for the presence of the novel apparatus comprising this invention, the fluid or vapor leaving the steam or other space 5 would pass directly to the nozzle 4. Instead, this novel apparatus, though composed of parts all of which are stationary, that is non-rotative, subjects the escaping fluid to a rapid whirling action. In consequence of this rapid whirling action substances heavier than the fluid are effectively separated therefrom, and, those remaining just before the fluid leaves the outlet, are completely separated therefrom.

In its best form the apparatus comprises two main portions, to wit, the top member 6 and the bottom member 7. The upper part of the member 7 fits into the bottom of the member 6 and most conveniently the parts are fixedly, though separably, attached one to the other as by means of a plurality of bolts 8 and pressure clips 9, see Fig. 2. It may be at once explained that as the parts must needs be introduced through the manhole 1' they must be of a size to permit such introduction. The device as a whole primarily takes its size from that of the outlet 3 to be served. Manholes are of standard size. The smaller sizes of this apparatus may be introduced intact, but the larger sizes must be made in separate parts, and devices of the largest sizes, though rarely requiring top members 6 which are made in two parts, usually are fitted with lower parts, i. e. tuyère rings 7 which, for convenience of introduction, are made in two parts.

The top member 6 is of generally circular form and is hollow. It is preferably a metal casting, so that all its portions may be integral; thus it is provided with the ears 8' for the bolts 8; with the upstanding portion $6^a$; with the tangential nozzle portion $6^b$, and with the oppositely extending supporting arms or brackets $6^c$. The latter contains slotted openings 6$^d$ and receive the bolts 10 by which the member 6 is bolted to or against the top of the drum 1.

It will now be apparent that the member 6 is essentially a hollow ring. The upstanding part 6$^a$ is a collar, which is larger than the outlet 3 of the drum. Its top is shaped to fit against the top of the drum and make a tight joint therewith. In lieu of a joint at this point the joint may be established between the top of the member 6 and the nozzle 4, as by means of a short nipple or sleeve 4', well shown in Fig. 2. In such case the nipple is held in the top of the member 6 and obviously is pushed up into the nozzle 4 by the pressure of the supporting bolts 10. When the nipple is used the collar 6$^a$ need not be used. In the top of the hollow ring proper is the central opening 6$^e$. In its bottom is the larger central opening 6$^f$. Between the two is the still larger annular cavity or centrifugal race 6$^g$, the bottom 6$^h$ of which is beveled or coned to merge with the margin of the large opening 6$^f$. The portion 6$^i$, forming the top of the cavity 6$^g$, surrounding the outlet opening 6$^e$, markedly overhangs the larger opening 6$^f$. A slight inclination downward toward the center may or may not be given the annular top surface 6$^i$. Within the portion 6$^b$ is the tangential discharge nozzle 6$^j$, the walls of which intersect the periphery of the race 6$^g$, and tangentially merge therewith. A pipe nipple 6$^k$ in the part 6$^b$ completes the top member 6. The annular bottom surface 6$^l$ of the member 6 contains a seat or centering sink, which conveniently receives the top of the lower member or tuyère 7.

A discharge pipe 12 leads downwardly from the nipple 6$^k$. This pipe may terminate with an open end near the bottom of the drum, but preferably leads out through the end of the drum and is connected with an automatic discharge trap. The function of the pipe will be explained hereafter in connection with the operation of the complete apparatus.

This present invention, which embraces various like structures by which the defined purposes may be attained, comprehends the employment of tuyères, i. e. rotation inducing members, of differing constructions but all generally typified by the member 7 herein illustrated. Said member 7, as here shown, is made up of a top ring 7$^a$, a plurality of angular or tangentially positioned tuyère blades 7$^b$ and a perforate bottom plate or disk 7$^c$. The inner edges of the blades substantially conform to or meet an imaginary cylinder, indicated by the dotted circles 7$^d$ of Figs. 4 and 5. This is true also of the inner periphery of the top ring 7$^a$, which also is substantially of a size with the large opening 6$^f$ in the bottom of the race member 6. Tuyère blades of either the overlapping arrangement of Figs. 4 and 5 or the non-lapping arrangement of Figs. 6 and 8 may be used. Being tangential to the aforesaid imaginary cylinder, both present tangential impact surfaces to the incoming fluid. The arrangements of Figs. 4 and 5 possess the advantage of both forming and directing the entering streams upon the tangential impact surface. A common advantage flows from the fact that the blades form long and relatively thin slots or tuyère openings 7$^x$ and hence, collectively, subdivide the fluid into many thin streams that substantially parallel the axis of the tuyère ring.

The bottom plate 7$^c$ of the multiply tuyèred member 7, as shown in Figs. 1, 2, 4, 5 and 6, contain a plurality of so-called slug dump openings closely adjacent the feet or lower ends of the tuyère blades 7$^b$. In Figs. 1, 2 and 4 these openings are marked 14; in Fig. 5, being of another shape, they are marked 15; in Fig. 6 the slug dump openings are marked 16, and in Figs. 7 and 8 the slug dump openings are virtually merged into a single peripheral opening 17. In the latter case the bottom of the tuyère ring comprises a relatively elevated bottom disk 18 and an underlying ring 19. The feet of the tuyère blades rise from the ring 19 and the disk 18 is supported from the same ring by a plurality of spacers or posts 20.

An optional guard or hood may or may not be used to prevent the dashing or splashing of slugs of fluid against the tuyère ring 7. This guard appears in dotted lines 13 in Fig. 1. The guard depends from the top casting. It serves to obviate the difficulties of side splashing and squirrel-caging in the drum, the same surrounding and in large measure defending the open tuyères 7$^x$ of the tuyère ring.

Being of little altitude and being suspended from the top of the drum it is obvious that the bottom of this centrifugal fixture is well removed from the agitated surface of the liquid in the drum. The velocity of the emergence of the fluid at the nozzle varies with the difference of pressure within and without the drum. In practice these velocities are high.

In aggregate area the many tangential tuyères 7$^x$ equal, or approximately equal, the area of the outlet opening in the top of the member 6. For some uses the aggregate area may be considerably less, whereas in other uses, where it is essential or desirable to avoid an arbitrary or artificial drop of pressure at the outlet the aggregate area may considerably exceed the area of the central outlet at the top of the fixture. Obviously the area of the slug dump openings described is to be considered in this connection.

Approaching the fixture, the vapor or other fluid impacts its surfaces. Finding exits between the tuyère blades and directed by the outer surfaces thereof the fluid is formed into the described relatively thin streams. These streams obviously enter the operatively cylindrical tuyère ring tangentially and encountering the annular arrangement of blades, combine to set up a very rapid whirling action within the tuyère ring and the top member of the fixture. On entering the tuyère openings the streams of fluid forthwith engage or impact the inner surfaces of the tuyère blades. These surfaces being tangential in position, conform to the normal angle of incidence of globules of liquid or particles carried by the streams of fluid. Due to this favorable position and relation the impact is non-disturbing in its effect upon the progress of such globules and particles and instead of being swept away they are virtually left or retained upon the inner surfaces of the tuyère blades. The accumulation of such impurities is proportionate to the quantity thereof present in the fluid passing through the fixture, and, while the deposit takes on the general whirling action of the body of fluid within the tuyère ring, that very whirling action insures the retention of the accumulated substances at the periphery of the whirling body, that is, on the inner sectional periphery of the tuyère ring.

As will be apparent, the main or general movement of the whirling body within the tuyère ring is axially toward the outlet $6^e$, which affords a free passage for the purified fluid. The upward sweeping action results in lifting the deposit of impurities to the top of the tuyère ring and into the bottom opening of the race member 6. Arriving there, the deposit of impurities is immediately forced outwardly by the strong whirling action of the body of fluid within the fixture, that is, by centrifugal force. In this manner the heavier substances are positively and definitely removed from the main stream of fluid just prior to the escape of the fluid at the outlet. And obviously the heavier substances, whirling at relatively high velocity in the relatively remote race $6^g$, are successfully retained in the race against possible removal by the outward sweep of the fluid. Indeed, the very effort of the fluid to escape longitudinally through the opening, irrespective of whirling action, tends to crowd the heavier substances into the remote parts of the immediately adjacent race. Once arrived in the race the heavier substances whirling therein immediately encounter the substantially tangential peripheral discharge opening or nozzle $6^j$ and leave the fixture through that avenue. Sufficient force is accumulated by the heavier substances to carry them well into the discharge pipe 12. This, added to the elevation of the fixture, admits of the return of the heavier substances to the undersurface portion of the fluid in the drum. Generally, however, it is preferred to get rid of the foreign substances by discharging them from the drum. Outside the drum an automatic discharge trap should be used to prevent the free escape of fluid from the drum and yet provide for the collection and intermittent discharge of the foreign substances delivered thereto by the pipe 12.

The main preventive action of this centrifugal fixture being now understood, attention is again directed to the excess or slug dump openings at the bottom or closed end of the tuyère member 7. Should the quantity of moisture or other impurities entering the tuyère ring at a given instant be of such weight that the carrier fluid, though moving with great velocity, lacks all of the energy needed to set that mass or quantity into rapid rotation and whirl it forward into the collecting and discharging race, there would be danger of the spreading of the impurities across the bottom of the tuyère ring and of the failure to completely rid the carrier fluid thereof, due to the impurities being caught in the central uptake vortex necessarily formed and maintained at the center of the whirling body of fluid in the tuyère ring. The function of the described slug dump opening or openings is to allow the excess moisture or impurities to drain back into the drum or container. This occurs notwithstanding the up-rush of carrier fluid through the slug dump openings. Further, those openings have a distinct function even in the absence of such masses of impurities as might momentarily overcome the energy of the whirling streams of carrier fluid. It may be pointed out that the drop of pressure within the tuyère ring as contrasted with the pressure in the surrounding space 5 is negligible. Further, as should be apparent, these streams entering tangentially into a tuyère chamber (the space defined by the annular series of blades) which is of greater diameter than the outlet $6^e$, have a distinct tendency to divide, that is, the upper part of each stream initially tends to not only move circularly within the tuyère but also tends pronouncedly to move upward. The lower part of each stream, on the other hand, tends to move downwardly. The proportion tending to move upwardly is very much greater than that tending to move downward by reason of the large opening at the top of the tuyère structure. Thus, it happens that even in the absence of heavy slugs there is a constant tendency to deliver some portion of the burden of moisture or other impurities upon the bottom or floor of the tuyère structure. Except for the openings at the periphery of that floor such small quantity of impurities might be carried across the floor and to the center thereof and find escape upward along the axis of the fixture. It should now be apparent that as the race that is closely adjacent the fluid outlet is of ample capacity to dispose of all impurities lifted into the same and as provision is now made to prevent the retention of impurities on the bottom of the fixture, the latter becomes well adapted to the ridding of the fluid of all or substantially all heavier substances or impurities under all conditions of actual operation.

Figs. 4 to 8 have been included in the drawings for the purpose of not only showing definite ways of providing for the immediate ejectment of excess and stray accumulations, but also to illustrate the fact that the slug dump opening or openings may be variously positioned and variously formed. The simple round openings 14 (Fig. 4) are positioned at the inner tips of the blades and admirably serve the above defined purposes. As shown by Fig. 5, like openings in the tuyère floor may be augmented in effect by providing them with slot-like elongations 15' immediately adjacent respective tuyère blades. Fig. 6 shows that the slug dump openings may be mere slots in the floor 7ᶜ adjacent respective blades, and Figs. 7 and 8 show that the last mentioned slots may be combined into a single annular opening with the same or even better effects.

The invention is not limited to this specific structure above defined, but includes various modifications, and more particularly that modification of the tuyère ring which is indicated by the part 21 of Fig. 2. The part referred to is merely an overhanging annular shoulder arrangement at the upper ends of the tuyère blades. It may be constituted by the top ring of the tuyère member. The purpose of this overhanging shoulder is to momentarily hold the carrier fluid and contained foreign substances against immediate upward movement into the discharge race. Thereby a longitudinally expulsive pressure is built up in the annular column thus held on the inner periphery of the tuyère ring, and this progressive effort has the effect of more positively expelling any accumulation of substances downward or outward through the described slug dump openings.

The centrifugal fixture above described actually performs and may be relied upon to perform in most satisfactory manner the objects and purposes set forth in the opening of this specification.

Having thus described my invention, I claim as new and desire to secure by Letters Patent:—

1. The process of purifying fluids that consists in setting the fluid into motion toward an outlet, causing and localizing the rapid rotation of the fluid adjacent said outlet and about the extended axis thereof, thereby collecting the heavier substances centrifugally and withholding them from said axis, permitting a quantity of said substances to discharge longitudinally in a direction opposite from said outlet, permitting a marked lateral expansion of the whirling action immediately adjacent said outlet and thereby laterally removing the remainder of the substances from the fluid and the region of said outlet, and, completing the state of separation of the last mentioned substances at a point laterally removed from said outlet while permitting the purified fluid to depart through said outlet.

2. The process of purifying fluids that consists in causing and localizing the rapid rotation of a stream of fluid beneath an outlet prior to the exit of the fluid through said outlet, while permitting a steady upward flow of fluid, thereby and meantime centrifugally separating heavier substances from the fluid, permitting a portion of said substances to escape at the bottom of the region of rotation, and as to the remainder, permitting a marked lateral expansion of the whirling action immediately below said outlet and thereby laterally removing such remainder of substances from the fluid while permitting the purified fluid to rise through said outlet, and, discharging the elevated substances at a point laterally remote from said outlet.

3. The process of purifying fluids that consists in causing and localizing the rapid rotation of the carrier fluid adjacent the fluid outlet, thereby centrifugally separating heavier substances from the carrier fluid, causing the progressive momentary movement of the fluid and substances in a direction axially opposite from said outlet and permitting the discharge of some of the separated substances in that direction, permitting the movement of the remainder of the separated substances toward said outlet, but allowing the quick rotative expansion of the fluid and substances in a plane immediately adjacent said outlet and discharging the latter substances at the periphery of such plane while permitting the purified fluid to escape through said outlet.

4. A centrifugal fluid purifying device comprising a race member having a central fluid outlet in combination with a coaxial annular tuyère having a closed bottom and fixed to said member, said tuyère being larger in diameter than said outlet and adapted to whirlingly direct the fluid into and through said member, said tuyère bottom being constructed and arranged to peripherally release part of the heavier substances separated from the fluid by the whirling action within the tuyère ring, and said member having a peripheral opening for the discharge of the remainder of the heavier substances.

5. A centrifugal fluid purifying device comprising a top member having a central top fluid outlet and containing an annular race below said outlet in combination with a coaxial tuyère ring larger in diameter than said outlet and smaller than said race and adapted to cause the whirling action of the fluid within itself and said member and generally toward said outlet, said member presenting an opening at the periphery of said race for the discharge of separated substances, and said tuyère ring having a bottom constructed and arranged to peripherally release a portion of separated substances.

6. A centrifugal fluid purifying device according to claim 5, characterized by a tuyère ring having slug dump openings in its bottom.

7. A centrifugal fluid purifying device in accordance to claim 5, characterized by a tuyère ring which presents a bottom adapted to peripherally release the heavier substances, and, at its opposite end, presenting an inward hanging annular shoulder or abutment 21 adapted to enforce the discharge of heavier substances through said bottom.

In testimony whereof, I have hereunto set my hand this 24th day of November, A. D. 1924.

CHARLES GILBERT HAWLEY.